United States Patent [19]

Sawa et al.

[11] Patent Number: 5,076,993

[45] Date of Patent: Dec. 31, 1991

[54] CONTRABAND DETECTION SYSTEM USING DIRECT IMAGING PULSED FAST NEUTRONS

[75] Inventors: Z. Peter Sawa, Oakland; Tsahi Gozani; Peter Ryge, both of Palo Alto, all of Calif.

[73] Assignee: Science Applications International Corporation, San Diego, Calif.

[21] Appl. No.: 464,111

[22] Filed: Jan. 12, 1990

[51] Int. Cl.$^5$ .............................................. G21G 1/06
[52] U.S. Cl. .................................. 376/159; 376/165; 376/166
[58] Field of Search .................... 376/159, 165, 166

[56] References Cited

U.S. PATENT DOCUMENTS

| | | | |
|---|---|---|---|
| 3,124,679 | 3/1964 | Tittman et al. | 250/43.5 |
| 3,146,349 | 4/1964 | Jordan | 376/159 |
| 3,767,919 | 10/1973 | Michaelis | 376/159 |
| 3,808,444 | 4/1974 | Schneeberger et al. | 250/492 |
| 3,832,545 | 8/1974 | Bartko | 376/159 |
| 3,997,787 | 12/1976 | Fearon et al. | 376/159 |
| 4,266,132 | 5/1981 | Marshall | 376/159 |
| 4,278,885 | 7/1981 | von Alfthan et al. | 376/159 |
| 4,320,298 | 3/1982 | Buford et al. | 250/358.1 |
| 4,756,866 | 7/1988 | Alvarez | 376/157 |
| 4,851,687 | 7/1989 | Ettinger et al. | 250/390.04 |
| 4,882,121 | 11/1989 | Grenier | 376/159 |

OTHER PUBLICATIONS

Firk, "Neutron Time-of-Flight Spectrometers", *Nuclear Instruments and Methods*, 162, 539–565 (1979).

Knoll, G. F., *Radiation Detection and Measurement*, John Wiley and Sons (1979).

"Neutron Radiology Takes X-ray Pictures—with a Difference," *Product Engineering*, vol. 42, No. 12, pp. 38–39 (Jul. 1971).

Smith et al., "Application of a 14 MeV Neutron Source to the Detection of Special Nuclear Material Diversion," *IEEE Transactions on Nuclear Science*, vol. NS-28, No. 2, p. 1637, (Apr. 1981).

Drndarevic et al., "A Signal for High Counting Rate Gamma Ray Spectroscopy with NaI(Tl) Detectors", *IEEE, Proceedings of Nuclear Science* (Feb. 1988).

Gozani, *Active Nondestructive Assay of Nuclear Materials*, United States Nuclear Regulatory Commission, NUREG-CR-0602 SAI-FM-2585 (1981).

Gozani et al., Nuclear-Based Techniques for Explosive Detection, *Journal of Energetic Materials*, 4:377–414 (1986).

*Primary Examiner*—Brooks H. Hunt
*Assistant Examiner*—Frederick H. Voss
*Attorney, Agent, or Firm*—Fitch, Even, Tabin & Flannery

[57] ABSTRACT

A system and method for detecting contraband generates a highly collimated beam of pulsed fast neutrons, having a pulse width on the order of a nanosecond, and an energy of 5 to 9 MeV. An object under investigation is scanned with the collimated pulsed beam. The neutrons in the beam cause (n, γ) reactions in a limited object volume or voxel, defined by the intersection of the collimated beam and the scanned object. The highly penetrating fast neutrons produce nuclear reactions with the atomic elements present within the object, causing gamma rays to be emitted. By measuring the approximate time of flight of the neutron pulse, a determination is made as to the particular voxel from which the gamma ray originated. The energy of the detected gamma rays identifies the particular elements from which the gamma rays originated. Thus, e.g., the carbon, nitrogen, oxygen, and chlorine content, which elements are commonly found in contraband, of a particular voxel can be determined directly and precisely. This voxel content information may be combined from a substantial sample of the voxels that make up the object to provide a direct indication of the elemental content of the object, and hence whether contraband is present or absent within the object.

26 Claims, 4 Drawing Sheets

CONTRABAND DETECTION SYSTEM USING DIRECT IMAGING PULSED FAST NEUTRONS

BACKGROUND OF THE INVENTION

The present invention relates to nuclear-based contraband detection systems, and more particularly to an apparatus and method for accurately detecting contraband concealed within a container, such as a suitcase, truck or other object. As used herein, the term "contraband" includes, but is not limited to, explosives and illicit drugs.

Diagnostic nuclear techniques in general involve use of two highly penetrating radiations (e.g., neutrons and gamma rays) which enable one to detect concealed explosives or other contraband materials. The radiations act as follows: An appropriately fashioned primary radiation excites atomic nuclei within a designated volume of an object. The excited atomic nuclei subsequently relax, emitting electromagnetic or particle radiation in the process that is characteristic of the nuclear species. The analysis of the emitted spectrum thus facilitates the detection of a particular substance within the object, e.g., explosives or illegal drugs. In other words, if the emitted spectrum includes radiation of a given energy, then the presence of a particular element within the object can be inferred. Thus, a spectrum showing characteristic radiation lines of particular intensities serves as a "signature" that identifies the presence of a particular chemical element within the object being examined. Identifying the chemical elements and/or chemical compounds within an object thus involves identifying the corresponding signatures that are present in the radiations emitted from the material. See e.g., Gozani, *Active Nondestructive Assay of Nuclear Materials*, United States Nuclear Regulatory Commission, NUREG-CR-0602, SAI-FM-2585 (1981).

It is common practice to use neutrons as the primary radiation and to measure the ensuing gamma-ray spectra for non-intrusive diagnostic purposes. U.S. Pat. No. 3,832,545 and patent application Ser. No. 07/053,950, filed 05/26/87, for example, disclose nuclear-based explosive detection systems that make use of neutrons of mainly thermal energies. In contrast, European Patent publication EP-O-227-497-A1 discloses a nuclear-based explosive detection system wherein fast neutrons of energies from 7 to 15 million electron volts (MeV) are employed. Disadvantageously, the thermal neutron based detection systems provide, for practical purposes, primarily only one signature of the four cardinal constituents of explosives, namely the signature of nitrogen (and possibly hydrogen). The fast neutron based detection system, on the other hand, may provide signatures of all four ingredients of explosives, or other contraband, thus enhancing the interrogating power of the fast neutron contraband detection systems. (The four cardinal chemical constituents of explosives are hydrogen, carbon, nitrogen, and oxygen.)

It must be observed, however, that simply obtaining the signatures of the constituent elements of a specified contraband does not necessarily indicate that such contraband is present in the object under investigation. This is because many benign materials (non-contraband) also include such elements. A great diagnostic advantage may thus be obtained when a three-dimensional image of the distribution of element densities within the interrogated body is also formed, as such image of densities may help further distinguish contraband from non-contraband. A suitable three-dimensional image for this purpose may advantageously be obtained by performing a section-by-section neutron irradiation of the object, and by performing a computer-based analysis of the energy and intensity of the gamma rays that are produced in each section. Such analysis has in the past required the judicious positioning of gamma-ray detectors around the object, as taught in Applicants' earlier patent application, Ser. No. 07/053,950, filed May 26, 1987.

As previously indicated, neutron interrogation of objects for the detection of contraband, e.g., explosives, is known in the art. One of the most common forms of neutron interrogation, and the only form that has yet been commercialized, is thermal neutron activation (TNA). In the TNA techniques, the object being interrogated is exposed to low energy neutrons, causing gamma rays having an energy characteristic of the element(s) within the object to be generated. The gamma rays of a particular energy are detected and counted. From such count, a determination can be made as to the abundance of nitrogen within the object being interrogated. The ability of TNA techniques to reliably detect the explosives depends greatly on the large nitrogen content and density of the explosive.

Another technique known in the art for detecting explosives is fast neutron activation (FNA). FNA techniques are similar to TNA techniques in that an object being interrogated is bombarded with neutrons. However, in the case of FNA, the neutrons have a higher energy, e.g., 14 MeV, and the gamma rays they generate allow the presence of additional elements to be detected. In particular, FNA allows the presence of hydrogen, carbon, and oxygen to be detected in addition to nitrogen. The relative concentrations of all of these elements thus comprise a "signature" that further helps to identify a particular substance, i.e., contraband.

A still further technique for detection of explosives involves detection of the alpha particle generated in a $T(d,n)^4He$ reaction which produces a 14 MeV neutron. The neutron and alpha particle are emitted in opposite directions. A small particle detector near the tritium target detects the alpha particle. The corresponding neutron is emitted at 180° within a solid angle equal to the solid angle subtended by the alpha detector from the target. This solid angle defines a "beam" of neutrons that is used to interrogate a sample, such as a suitcase or other container. A gamma ray detector is placed near the sample, detecting gamma rays in coincidence with the alpha particles. The time difference between the alpha particle detection and gamma ray detection can provide the position of the gamma ray source along the beam. By scanning the beam, a three-dimensional image of the gamma ray sources can thus be generated.

Finally, as indicated in French patent document #EP 0 227 497 A1, and a paper recently presented in the 5th Asia/Pac Aviation Seminar in Kuala Lumpur (Aug. 17-21, 1987), it is also known in the art to combine both fast and thermalized neutrons in the same detection system. As indicated in these documents, a partially moderated 14 MeV pulsed neutron source is used with one or more well shielded germanium detector(s). Nitrogen and oxygen are determined through $(n,x\gamma)$ reactions during the bursts of the fast neutrons, and hydrogen and chlorine are determined between pulses through $(n,\gamma)$ reactions with thermalized neutrons.

SUMMARY OF THE INVENTION

In general and simple terms, the present invention provides a highly effective and direct manner for using neutrons to "look inside" a closed object or container, such as a cargo truck or a piece of luggage, to determine the abundance of particular atomic nuclei, i.e., elements, therewithin. Once such abundance is known, the identification of particular contraband is readily accomplished, as all contraband of interest contains specific atomic elements in identifiable proportions and densities. As with prior art approaches using nuclear techniques, the "looking inside" of the object is achieved by detecting gamma rays produced in nuclear reactions. The gamma rays have energies characteristic of the particular atomic nuclei, which nuclei represent the residuals of these nuclear processes. Unlike prior art approaches, in which the object is immersed in a bath of thermal (low energy) neutrons, thereby causing a large number of gamma ray sources to be produced in an extended volume, and thereby necessitating the use of a large number of gamma ray detectors and a rather complex processing procedure to reconstruct useful image data from the gamma ray data, the present invention uses a highly collimated short pulse of fast (high energy) neutrons to sequentially interrogate small volume elements ("voxels") of the object. In this manner, the present detection system is thus able to "see" right into a particular voxel and directly determine what elements are present therein based on the gamma rays that are detected. By looking in a controlled (and rapid) sequence into a sufficient number of voxels in this manner, a direct indication is thus obtained of the abundance of prescribed chemical elements within the object.

In keeping with one aspect of the present invention, a rapid yet effective system for the reliable detection of designated types of contraband, including explosives, using pulsed fast neutron activation (PFNA), is provided. In one embodiment, the pulsed beams of fast neutrons are collimated to a very high degree, i.e., pencil beams, using the kinematics of a A(B,n)-nuclear endothermic reaction where $M_B >> M_A$. The pulse width is on the order of a nanosecond (preferably less). These pulsed neutrons are directed to the object under investigation and cause (n,x$\gamma$) reactions (preferably with x=n') in a limited small object volume that is defined by the intersection of the pencil beam and the screened object.

By choosing appropriately the lateral section of the scanning neutron pencil beam, i.e., the reaction kinematics, if required augmented with an external collimation, and by measuring the time-of-flight of the interacting neutrons, a convenient subdivision of the object into a string of small volume elements, i.e., "voxels", is realized. By precisely controlling the time of occurrence including duration of the neutron burst and determining the time of gamma ray detection, it is thus possible, to determine the particular region, or voxel, from which the gamma ray is produced. Since the highly penetrating fast neutrons have a high probability for gamma ray production nuclear reactions with the elements oxygen, carbon, chlorine and nitrogen, the carbon, nitrogen, oxygen, and chlorine content of a particular voxel can advantageously be determined directly and precisely, which determination leads directly to an indication as to whether such particular voxel contains contraband. By combining this information from a substantial sample of the voxels that make up the object, the presence (or absence) of any type of contraband within the object can be inferred quantitatively with a high degree of reliability. In addition, by relaxing the fast timing condition, other chemical elements, such as hydrogen, can be determined advantageously through the neutron thermalization process and its subsequent radiative capture in the screened object.

In an alternative embodiment of the present invention, the pulsed fast neutrons are produced in the A(B,n) reactions where $M_B \leq M_A$, i.e., reactions such as D(d,n), T(d,n) or Li(p,n). Subdivision of the interrogated object into voxels using this embodiment is obtained by using an external neutron beam collimator and may involve the positioning of gamma ray detectors.

In a still further alternative embodiment, the interrogated object is irradiated from many directions using, e.g., multiple sources of pulsed fast neutrons, including appropriate transport of the ion beams and/or movement and/or rotation of the object. The sizes and loci of the voxels are derived in accordance with this embodiment mainly from the measurements of the time of flight of the neutrons and gamma rays.

The present invention may thus be characterized as a contraband detection apparatus that includes: (1) scanning means for scanning an object under investigation with a pulsed beam of fast neutrons; (2) first detecting means for detecting gamma rays emitted from the object as a result of interactions between a neutron from the pulsed beam of fast neutrons and an atomic nucleus within the object; (3) identifying means for identifying the particular atomic element which gives rise to the detected gamma ray; (4) locating means for determining the approximate location within the object of the origin of each gamma ray detected by the detecting means; and (5) second detection means responsive to the scanning means, identifying means and locating means for detecting a distribution and concentration of at least one atomic element within the object indicative of the presence of contraband.

Another embodiment of the invention may be characterized as a contraband detection system comprising: (1) means for generating a recurring short pulse of directed fast neutrons; (2) means for scanning an object under investigation for the presence of contraband with this recurring short pulse of fast neutrons, each of the fast neutrons possibly reacting with a particular atomic nucleus present within the object, thereby generating gamma rays having an energy characteristic of the particular atomic nucleus with which the fast neutrons react; (3) means for detecting the gamma rays produced by neutrons in reactions with atomic nuclei, the detection means including means for detecting the energy of a particular gamma ray and the time of its detection relative to the time of generation of the short pulse of fast neutrons; and (4) means for determining a particular volume element, or voxel, within the object from which a particular detected gamma ray originated, the detected gamma ray thereby providing a direct indication of the particular atomic nuclei in the particular voxel. Using this system, the particular atomic nuclei present in a sample of the voxels within the object advantageously provide a direct indication of the abundances and distributions of particular elements within the object. This determination, in turn, provides a direct indication of the presence or absence of contraband, as the presence of contraband is indicated by a prescribed abundance and distribution of the particular elements within the object.

Further, the present invention may be characterized as a system for detecting contraband comprising: (a) means for scanning an object under investigation with a pulsed beam of fast neutrons by controllably directing the pulsed beam at a prescribed volume of the object; (b) means for detecting gamma rays having prescribed energies emitted from the prescribed volume of the object as a result of interactions between the pulsed fast neutrons and atomic nuclei of particular elements within the prescribed volume, the prescribed energies corresponding to atomic elements commonly found in contraband; and (c) means for ascertaining whether a distribution and concentration of at least one atomic element indicative of contraband exists within the prescribed volume. Using this system, the determination that contraband is present within the prescribed volume advantageously allows investigation of the object using pulsed fast neutron to be terminated, thereby reducing the amount of time required by the system to detect contraband within the object. That is, if contraband is found in a single voxel of the object, there is no need to continue searching through other voxels of the object. However, as desired and/or required, additional prescribed volumes, e.g. adjacent voxels, of the object can be similarly investigated in order to confirm the presence of contraband within the object.

The invention also includes a method of detecting contraband comprising the steps of: (a) directing a pulsed beam of fast neutrons towards a prescribed volume of an object under investigation; (b) detecting gamma rays having prescribed energies emitted from the prescribed volume of the object as a result of interactions between pulsed fast neutrons and atomic nuclei of particular elements within the prescribed volume of the object, the prescribed energies corresponding to atomic elements commonly found in contraband; and (c) repeating steps (a) and (b) for a sufficiently large number of small prescribed volumes of the object under investigation so as to ascertain whether a distribution and concentration of at least one atomic element indicative of contraband exists within the object.

It is a feature of the present invention to provide a contraband detection system that has improved sensitivity, i.e., an improved ability to reliably detect the elements that make up prescribed contraband, regardless of the form of the contraband or the manner in which the contraband may be arranged or hidden within the object. As a result of this improved sensitivity, the detection system of the present invention advantageously provides a higher probability of detection (PD) and a lower Probability of False Alarm (PFA) than has heretofore been possible with prior art contraband detection systems.

It is another feature of the present invention to provide such a detection system wherein the requisite information upon which a contraband/non-contraband decision is based is obtained directly from scanning data obtained from the object under investigation without significant additional processing, and/or probabilistic assessments, thereby allowing a noticeable improvement in the throughput time, i.e., the time it takes to put an object through the system to determine if it contains prescribed contraband.

It is still another feature of the invention to provide a contraband detection system that is available for use with more diverse types and forms of objects to be examined. For example, where the object being examined is luggage, the present invention may examine all sizes and types of luggage, from small carry-on parcels, to larger check-in luggage, to full luggage carts and other large containers. Where the object being examined is a cargo truck, all sizes of trucks or equivalent cargo-carrying vehicles can be readily examined using the system of the present invention.

Another feature of the invention allows the detection of contraband to occur without using a large number of gamma-ray detectors, as has heretofore been required with nuclear-based detection systems. With prior art systems, such as is disclosed in U.S. Patent Ser. No. 07/053,950, it has been necessary to surround the object being examined with a large number of detectors so that the particular detector that sensed an emitted gamma ray could also provide some indication as to the location within the object from where the gamma-ray originated, thereby helping to form a density map of the contents of the object. With such prior art approach, it is necessary to not only determine that a gamma ray of a specified energy has been detected, but it is also necessary to know and track the particular detector (within an array of a large number of detectors) where the detection occurred. In contrast, the present invention only requires a few detectors because it is the time-of-flight measurement and the lateral size of the neutron beam that determines the origin of the gamma ray of a particular energy (and hence the location of a particular element), and this measurement is not significantly dependent upon the location of the detector. As a result, the present invention advantageously provides an image of the elemental distribution within the object directly without the need for a large detector array or complex mathematical reconstruction.

Still further, it is a feature of the present invention to provide a detection system that exhibits an improved signal-to-noise ratio. This improved signal-to-noise ratio results largely from the pulsed nature of the highly collimated interrogating neutrons. That is, the collimated pulsed neutrons produce gamma rays only in desired regions or voxels of the object during a prescribed time window. Hence, the amount of background noise (i.e., gamma rays not of interest, such as those produced in the detector or in other locations or regions of the object or its surrounding environment) present in the time windows of interest is significantly reduced, thereby improving the signal-to-noise ratio.

A further feature of the invention provides for the detection of contraband without the necessity of detecting associated particles, which associated particle detection is mandatory in some prior art systems. Advantageously, because associated particles, e.g., alpha particles, do not need to be detected, the intensity of the interrogating beam is not limited as it is in systems where associated particles are detected (in which systems the count rate capability of the associated particle detection channel severely limits the beam intensity).

It is yet another feature of the invention to provide a reliable nuclear-based contraband detection system employing fast (high energy) neutrons that exhibits significantly reduced shielding requirements, geometry constraints and equipment specifications over prior art nuclear-based detection systems.

BRIEF DESCRIPTION OF THE DRAWINGS

The above and other aspects, features and advantages of the present invention will be more apparent from the following more particular description thereof, presented in conjunction with the following drawings and appendix wherein.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
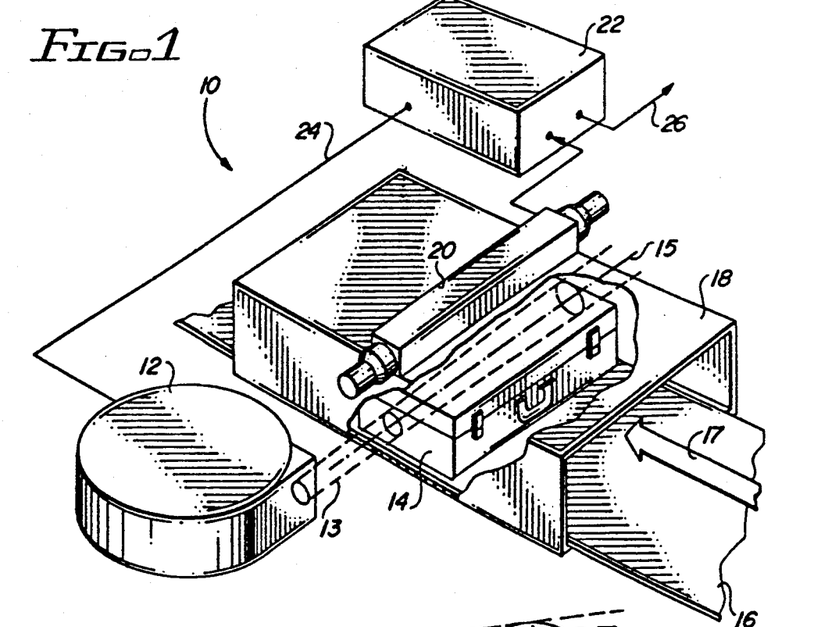
FIG. 1 is a schematic representation of the main components used with the direct imaging pulsed fast neutron contraband detection system of the present invention.

Referring first to FIG. 1, a contraband detection system 10 made in accordance with the present invention is schematically depicted. The system includes a pulsed accelerator 12 that generates a collimated pulsed neutron beam 13. The beam 13 is directed towards an interrogation chamber 18 defining a path 15. An object 14 to be investigated is passed by means of a conveyor belt 16, or equivalent movement mechanism, through the interrogation chamber 18 in a direction 17 transverse to the beam path 15. Thus, at any instant of time, the beam 13 passes through a known volume of the object 14, where this volume is centered around the beam path 15. (As explained more fully below, the kinematics of the neutron producing reaction cause the beam to form a narrow cone about the desired beam path 15.) It is to be emphasized that while the object 14 shown in FIG. 1 is depicted as a suitcase, this is only exemplary as many different types of objects, of all different sizes, may advantageously be scanned for contraband in accordance with the teachings of this invention.

A detector array(s) 20 is positioned adjacent the beam path 15, typically mounted inside the interrogation chamber 18, or equivalent casing, through which the object passes as it is probed with the penetrating pulsed neutron beam. This detector array 20 includes one or more gamma ray detectors that detect any gamma rays incident thereto that are emitted from the object 14 as a given pulse of the beam 13 passes therethrough. Each gamma ray thus detected causes a detection signal to be generated that is sent to process circuitry 22. The process circuitry 22 measures the time at which the neutrons are produced, the energy of the detected gamma ray, and the time at which the detection signal is received. Knowing when a given pulse of the neutron beam 13 starts, and measuring the time when a given gamma ray is detected, it is thus possible for the process circuitry 22 to determine the time of flight of the neutron in the pulsed beam 13 responsible for producing the detected gamma ray. This time-of-flight information, coupled with the known velocity of the neutron as determined by the kinematics of the neutron producing reaction, allow the process circuitry 22 to make a fairly accurate determination as to the location within the object 14 along the beam path 15 whereat the gamma ray originated.

The determination of the particular location of the origin of the gamma ray within the object 14 is based on the time-of-flight measurement, and on the fact that the velocity of the neutron is appreciably slower than the velocity of the gamma ray. For example, assuming the fast neutron has an energy of 10 MeV, the velocity of the neutron will be on the order of $4.37 \times 10^7$ m/sec. In contrast, an emitted gamma ray has a velocity that is very nearly the speed of light ($3 \times 10^8$ m/sec). Thus, e.g., the gamma ray that is produced as a result of a nuclear interaction between the neutron and an atomic nucleus will travel to the detector much faster than the scattered neutron. Accordingly, one may assume that the measured time-of-flight is the time of flight of the neutron that induced the emission of the detected gamma ray. Nonetheless, as explained below, corrections can be made as required in order to account for the gamma ray travel time portion of the time-of-flight measurement.

Because the energy of the detected gamma ray allows the particular element from which the gamma ray originated to be identified, as is commonly done in nuclear-based detection systems, the system shown in FIG. 1 is thus able to determine directly the location of a particular element within the object 14. By scanning the object 14 with the beam 13 in a controlled fashion, so that substantially all relevant portions of its volume have a pulsed neutron beam pass therethrough during some portion of the scanning operation, it is thus possible to make a direct determination of the distribution of the elements within the object (or at least the elements of interest, i.e., those commonly found in the particular type of contraband being detected). This distribution information may be considered as an elemental map, and may be represented by appropriate data signals available as output data from the process circuitry 22, e.g., on data line 26. From this data, a direct finding may be made as to whether the object 14 likely contains any contraband, as the composition and distribution of elements within the object provides a valid indicator as to whether such elements are contraband, e.g., explosives or illicit drugs. If a finding is made that the object may contain contraband, appropriate control signals are generated, either by the process circuitry 22 or an auxiliary computer coupled thereto, to trigger an alarm (audible and/or visual) to automatically divert the object 14 to a location where further examination may be performed.

In some embodiments, the elemental map may be displayed on a CRT screen. Such map, while being displayed on a two-dimensional surface, may nonetheless appear as a three-dimensional image. Advantageously, using conventional computer aided graphics capabilities, the volumes of interest of the object thus displayed may also be selectively turned, rotated, enlarged, etc. Such an image display of the object advantageously assists an operator in further analyzing whether the object contains contraband.

Thus, as indicated from the above overview, the basic concept of the present invention is to use a pencil beam of pulsed energetic neutrons whose pulse length is much shorter than the travel time of the pulsed neutrons across the whole object to be interrogated. Through timing measurements, the position of the neutron pulse along the beam can be determined, thereby allowing the contents of the object at the particular volume element (voxel) where the neutron pulse encounters atomic nuclei to be determined. The neutrons interact in various ways (mostly by inelastic scattering) with the nuclei inside the interrogation volume. The intensities of the characteristic de-excitation gamma rays resulting from these reactions determine the relative abundance of the elements within that volume.

Figure 2:
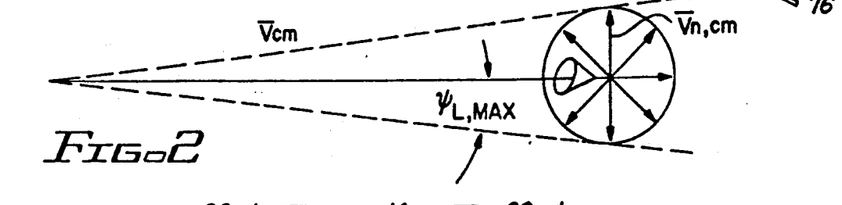
FIG. 2 shows schematically the principle of kinematically focused, neutrons.

It is contemplated that at least two methods may be used to produce the collimated beam of neutrons. The first method exploits the large center of mass velocity obtained when a heavy ion beam (HI) impinges on a hydrogen nucleus (H) with energies near the threshold for the H(HI,n)HI′ [or (n,p) threshold in the c.m. system] reaction. Product neutrons produced from this method are confined to a forward cone with a small open angle, as shown schematically in FIG. 2. In FIG. 2, the c.m. velocity ($v_{cm}$) of the system is large because it is supplied by the massive incoming heavy ion. Close to the threshold, the velocity component of the neutron in the c.m. system ($v_{n,cm}$), shown in FIG. 2, is small. The outgoing neutrons are thus focused in the laboratory system into a cone whose maximum angle is given by $\sin \Psi_{L,MAX} = v_{n,cm}/cm$.

The second method of producing a collimated beam of neutrons is based on the forward peaking of neutrons produced in the $D(d,n)^3He$ reaction using energetic deuterons and an external collimator.

Figure 3A:
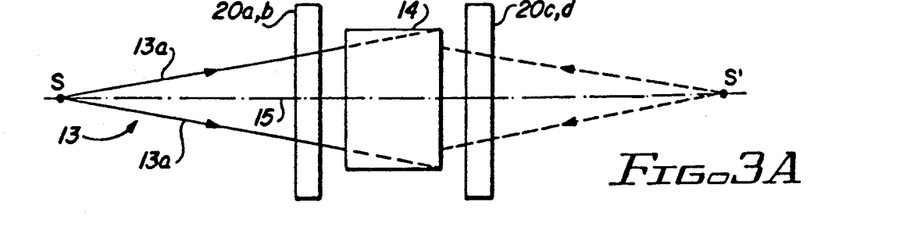
FIGS. 3A and 3B depict end and side schematic views, respectively, of an object being investigated with a beam of pulsed fast neutrons in accordance with the present invention.
Figure 3B:
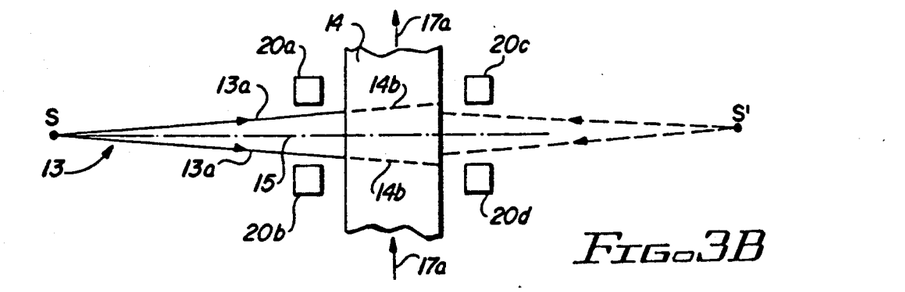

Referring next to FIGS. 3A and 3B, a possible technique for scanning an object with a D(d,n) neutron beam is shown. FIG. 3A shows an end schematic view and FIG. 3B shows a top schematic view of an object 14 being investigated in accordance with the present invention. The point S represents a pulsed neutron source. A pulsed beam 13 originates at the source S, following a path 15. This pulsed beam 13 is bounded within a fan shaped cone 13a, for the reasons previously explained (see FIG. 2). A suitable collimator (not shown) may be used to narrow the fan shaped cone in one direction, e.g., as seen in the top view of FIG. 3B, thereby directing the beam to pass through a narrow slice defined by the dotted lines 14a and 14b of the object 14. Appropriate detectors 20a, 20b, 20c and 20d may be positioned on either side of the object 14. Each detector 20a, 20b, 20c or 20d may comprise a single detector, or an array of a plurality of detectors, as desired. Other detector configurations and placements may also be used.

In operation, the narrow fan pulsed beam 13 passes in between the detectors 20a and 20b into the narrow volume slice of the object 14 bounded by the lines 14a, 14b. Any pulsed neutrons that strike the detectors 20a-d will create a large number of background gamma rays. Advantageously, however, such background gamma rays can be readily excluded using the time-of-flight measurement techniques herein described. (Using such techniques, gamma rays originating within detectors 20a and 20b would be detected too soon and gamma rays originating within detectors 20c and 20d would be detected too late, to have possibly originated within the object 14. Thus the measurement of such early and late gamma rays can be advantageously excluded, thereby eliminating a large source of background noise.). Only gamma rays originating within the narrow slice volume 14a, 14b would arrive at one of the detectors 20a-d within the appropriate time window. Thus, only these gamma rays provide a measure of the constituent elements within the volume slice bounded by the lines 14a, 14b. As the object 14 moves relative to the beam 13, a different volume slice (voxel) of the object is investigated. As the entire object 14 moves in front of the beam 13 (or as equivalent relative motion is created between the object 14 and the beam 13, using appropriate scanning means, which relative motion is represented by the arrows 17a,), all of the volume slices within the object may thus be investigated. Moreover, as explained below in connection with FIG. 4, the measured time of arrival of a particular gamma ray within the acceptable time window further defines the location within the object 14 where the gamma ray originated.

It will be appreciated, of course, that numerous variations of the basic scanning method shown in FIGS. 3A and 3B could be used. For example, multiple pulsed neutron sources could be used, each directing a pulsed neutron beam at a different side of the object 14. (In FIGS. 3A and 3B, for example, another pulsed beam source S′ is shown on the side of the object 14 opposite the source S.). Additional collimators may be used, as desired, to limit the volume slice irradiated by the pulsed beam to a fraction of the volume slice bounded by lines 14a, 14b, e.g., to one-half, one-third, or one-fourth thereof. Appropriate means may then be used, either my moving the object 14 and/or moving or steering the beam 13, in order to ensure that the entire object 14 is sufficiently irradiated by the pulsed beam(s), voxel-by-voxel.

Figure 4A:
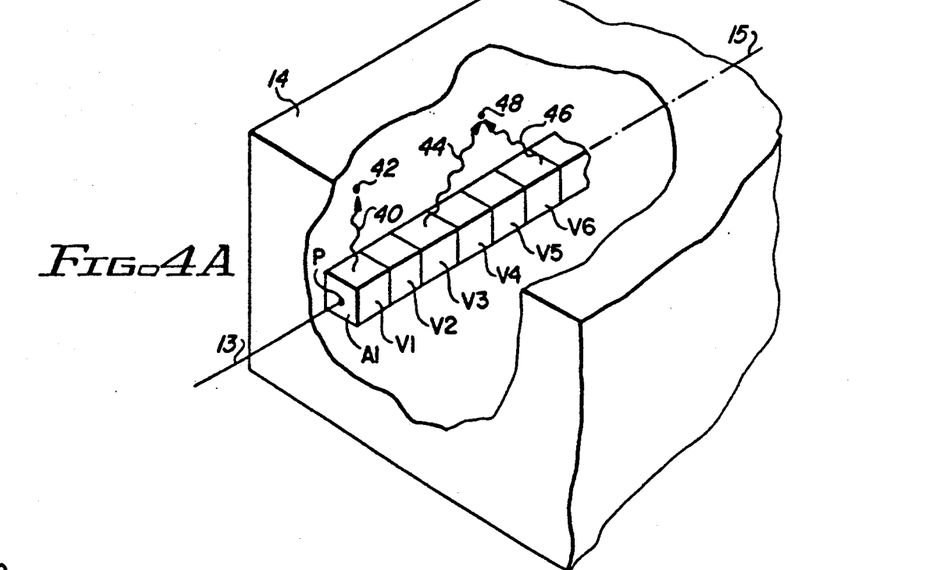
FIG. 4A illustrates an enlarged section of the suitcase of FIG. 2 and shows the small volume elements (voxels) through which the pulsed fast neutrons travel.

FIG. 4A illustrates an enlarged section of the object 14 and depicts the concept of "voxels", or small volume elements, through which the pulsed fast neutrons travel. As explained above, when the pulsed beam of fast neutrons 13 is directed to a spot P on the surface of the object 14, it typically propagates through the object 14 within a region defined by a narrow cone (see FIG. 2). Thus, any particular neutron within the beam 13 may actually impinge anywhere within an area A1 on the surface of the object 14, rather than on a spot P centered in the area A1. For the purpose of clarity in illustrating the concept of voxels, the area A1 in FIG. 3A is shown as a square, thereby allowing the voxels to be illustrated as cubes. In actuality, however, it is to be appreciated that the area A1 is normally rectangular or circular, and the voxels thus assume a shape that is more like solid sections of a cylinder than a cube. Behind the area A1 lies a small volume element, or voxel, V1 through which the beam 13 initially passes. The depth of the voxel is mainly determined by the length of the neutron burst. Similarly, behind the voxel V1 lies a second small volume element, or voxel V2, also centered about the beam path 15, through which the pulsed fast neutron beam 13 passes after it has traversed voxel V1. Other voxels, V3, V4, V5, V6, and so on, are also centered about the beam path 15 and define a string of small volume elements through which the beam 13 may pass after if has traversed through the first voxel.

As the beam 13 passes through a given voxel $V_n$, it may encounter an atomic nucleus, in which case a gamma ray may be emitted. For example, in FIG. 4A, a gamma ray 40, represented as a wavy arrow, may be produced as a result of a nuclear interaction between a neutron in the pulsed beam 13 and an atomic nucleus within voxel V1. This gamma ray 40 may be detected at spot 42 with a suitable gamma ray detector. Similarly, other gamma rays 44 and 46 may be produced within voxels V3 and V6, respectively, as a result of nuclear interactions occurring therewithin.

Once a gamma ray is produced within a given voxel $V_n$, it may travel out unscattered from the voxel and be absorbed in a gamma ray detector. If desired, of course, detectors may be positioned at several locations, around the voxels so as to increase the probability that a given gamma ray will be detected.

As represented in FIG. 4A, the gamma rays 44 and 46 travel to the same detector location 48, whereas the gamma ray 40 travels to a different detector location 42. As explained more fully below in connection with FIG. 4B, it matters little which particular detector senses a gamma ray. All that matters is that the gamma ray is detected and that the time of its detection is noted.

Figure 4B:
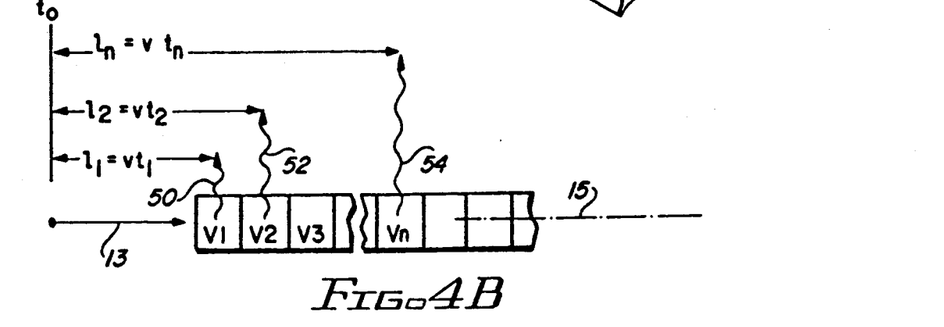
FIG. 4B schematically shows a side view of the voxels of FIG. 4A, and illustrates the manner in which the time of arrival of a gamma ray can be used to determine the particular region within the object from which the gamma ray originated.

FIG. 4B illustrates the manner in which the approximate location, i.e., the particular voxel, of the origin of a given gamma ray is determined. This determination is made based upon the time of flight of the neutron. The time of flight of the neutron is measured by noting the time the neutron starts in the pulsed beam 13, represented in FIG. 4B as time $t_0$, and by measuring the time of arrival of a gamma ray at any detector, which time of arrival for any given voxel n may be represented as $t_n$. The kinematics of the neutron producing reaction are known, and hence the velocity of the neutron is known. Further, the time of flight of the neutron represents the predominant portion of the total time of flight of the neutron and gamma ray. In other words, for most purposes, the time of flight of the gamma ray represents only a small portion of the total time between the start time of a neutron, at time $t_0$, and the arrival time of an associated gamma ray, at time $t_n$. Hence, for most purposes, the gamma ray flight time can be ignored. Thus, the relative location of the atomic nucleus within the object 14 responsible for producing a given gamma ray is proportional to the arrival, time $t_n$ (and in fact, the approximate location of gamma ray origin can be calculated from the arrival time $t_n$ and the known velocity of the neutron, v). This concept is illustrated in FIG. 4B where the depth or location of the source of gamma ray 50 is at distance $l = vt_1$, where $t_1$ represents the arrival time of the gamma ray. Similarly, the location of the source of gamma ray 52 is at distance $l_2 = vt_2$; and the location of the source of gamma ray 54 is at distance $l_n = vt_n$, where $t_2$ and $t_n$ represent the arrival times of gamma rays 52 and 54, respectively. By noting that the distance $l_1$ is less than the distance $l_2$, and by knowing the location of the interrogated object, i.e., the spacing between the source of the neutron beam and the object being interrogated, it is a simple matter to show that the gamma ray 50 originated from within voxel V1 and the gamma ray 52 originated from within voxel V2. Advantageously, because the depth of the location of the origin of the gamma ray along the beam path 15 is proportional to the arrival time of the gamma ray, the particular voxel $V_n$ from which a gamma ray arriving at time $t_n$ originated can be simply determined by measuring by the value of $t_n$.

It is noted that the voxel interrogated by the pulsed fast beam need not be limited to a small voxel relative to the total volume of the object 14, as is suggested in FIG. 4A. Rather, for some applications, a particular voxel may be, e.g., a substantially large fraction of the object 14 being investigated. In fact, in some instances, a single voxel may comprise the entire volume of interest of the object being examined. Moreover, while several voxels may typically have to be examined in order to confirm the presence of contraband within the object 14, it will be sufficient in some instances for the invention to simply detect the appropriate elements indicative of contraband in a single voxel, in which case the object can be immediately flagged as one having contraband. That is, as the pulsed fast neutrons search the object for contraband voxel-by-voxel, there is no need to continue searching once contraband has been identified in one voxel. Rather, the searching can stop, the object can be flagged, and the next object to be investigated can be searched, thereby increasing the average throughput of the system.

Figure 5A:
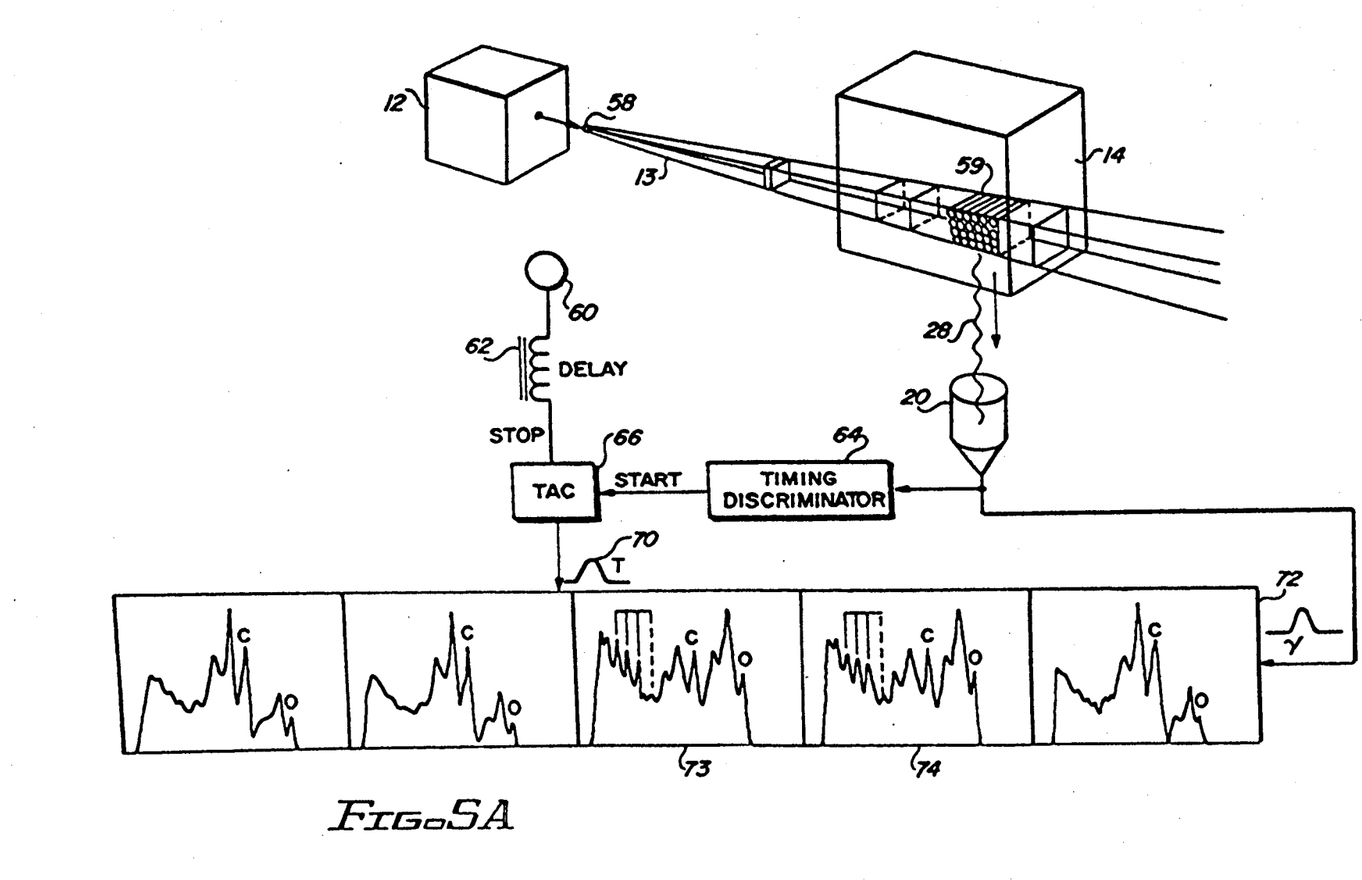
FIG. 5A is a schematic diagram of the pulsed fast neutron direct imaging system of the present invention; and depicts how the time of flight technique is used to produce a two-dimensional time-energy spectrum, from which spectrum the relative concentration of specified elements and their position within the object being examined can be directly deduced.

Referring next to FIG. 5A, a schematic diagram of a preferred pulsed fast neutron direct imaging system in accordance with the present invention is illustrated. An accelerator 12 produces a beam 13 of pulsed neutrons according to known. In general, these techniques involve accelerating a heavy ion, such as $^{14}N$ or $^2H$ towards a target 58, in which target the neutrons are produced. A cyclotron 60 is an exemplary device that may be used for accelerating the ions because it produces an intense ion beam having an inherently short duration. However, it is to be understood that other devices, such as properly instrumented electrostatic generators, could also be used to produce the pulsed neutron beam. As described above, the pulsed neutrons enter the object 14 following a path that carries the neutrons through respective regions or voxels of the object. Five such voxels are schematically illustrated in FIG. 5A, with benign materials present in three of the five voxels and explosive material in the other two voxels. A gamma ray 28 is produced as a result of the interaction between a given neutron and an atomic nucleus. FIG. 5A shows, as an example, the gamma ray 28 originating from explosive material 59 within the object 14. The gamma ray 28 is detected by the gamma ray detector 20'. For each gamma ray detected by the gamma ray detector 20' (or other detectors used in conjunction with the gamma ray detector 20'), the energy of the gamma ray and the time of flight of the neutron is determined. From this time of flight, a direct indication is advantageously made as to the location within the object 14 of the origin of the detected gamma ray 28, and hence, the location of particular elements of interest, e.g., explosive material, within the object 14.

The time of flight is determined by noting the time between the start of the neutron pulse and the arrival of the gamma ray at the detector 20'. This time of flight is determined, in a preferred embodiment, as follows: a timing pulse associated with the accelerator 12 indicates the beginning of the neutron flight. Alternatively, a gamma ray "flash" from the target 58 may also indicate the beginning of the neutron flight. The time of the occurrence of the interaction is derived from the de-excitation gamma ray 28 signal's arrival at the gamma ray detector. This time may be suitably corrected for the gamma ray transit time, if desired. However, as noted above, the gamma ray transit time represents only a small portion of the overall time of flight.

Figure 6:
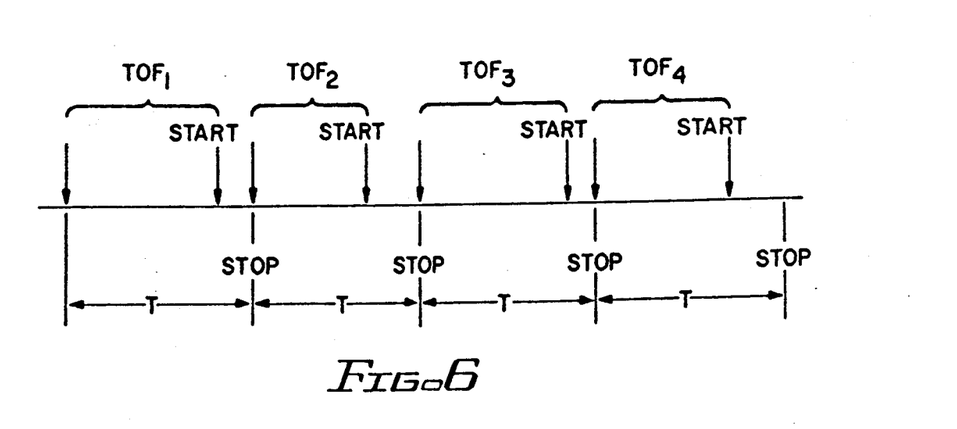
FIG. 6 is a simple timing diagram illustrating one manner in which time of flight may be measured.

In a preferred embodiment, as shown in FIG. 5A, the time of flight (TOF) for instrumental reasons is determined by measuring the time that elapses between the arrival of the gamma ray at the detector and the time of production of the next reaction burst. The timing associated with such a measurement is illustrated in FIG. 6. Note that the repetition rate period, T, of the neutron burst is selected to be only slightly longer than the longest time of flight anticipated for a neutron to traverse the entire width of the object 14. As shown in FIG. 5A, a time to amplitude converter (TAC) 66 is used to generate an analog signal 70 having an amplitude that is proportional to the time between a start pulse and a stop pulse. For the embodiment shown in FIG. 5A, the start pulse, as stated above, is derived from the time at which the gamma ray 28 is detected at gamma ray detector 20'. A suitable timing discriminator 64 is used to ensure good definition of the start times presented to the TAC 66. The stop pulse is provided by timing signals derived from the pulsed accelerator 12. Thus, as represented in FIG. 5A, the output signal 70 of the TAC 66, gives rise to a time of flight spectrum, where the direction of the time axis is reversed.

The output from the gamma ray detector 20' also gives rise to energy spectra similar in kind to spectra obtained using other detection systems as described, e.g., in prior patent applications, and the manner in which such output is detected and processed may likewise be the same. See, e.g., U.S. Patent Application Serial No. 07/367,534, filed 06/16/89; and U.S. patent application Ser. No. 07/053,950, filed 05/26/87 which applications are incorporated herein by reference. By associating the gamma ray energy of an event with each time of flight occurrence, a two-dimensional time-energy spectrum 72 is obtained. This time-energy spectrum advantageously depicts energy-time information from which the relative concentration of specified elements and their position within the object 14 is directly deduced. To illustrate, each vertical pattern within the spectrum 72 represents the energy distribution of the gamma rays for the five different volume elements or voxels of the object 14. For the representative spectrum 72 illustrated in FIG. 5A, for example, it is seen that each gamma ray spectrum (vertical patterns) consists of lines indicating the elements present within that region or voxel. For instance, the energy spectra 73 and 74 (which energy spectra are associated with gamma rays produced in the voxels of the object 14 wherein the explosive material is located) depict a high concentration of nitrogen and oxygen lines. This depiction thus indicates that nitrogen and oxygen are located within these voxels, thereby leading to the deduction that contraband is present within these voxels.

Figure 5B:
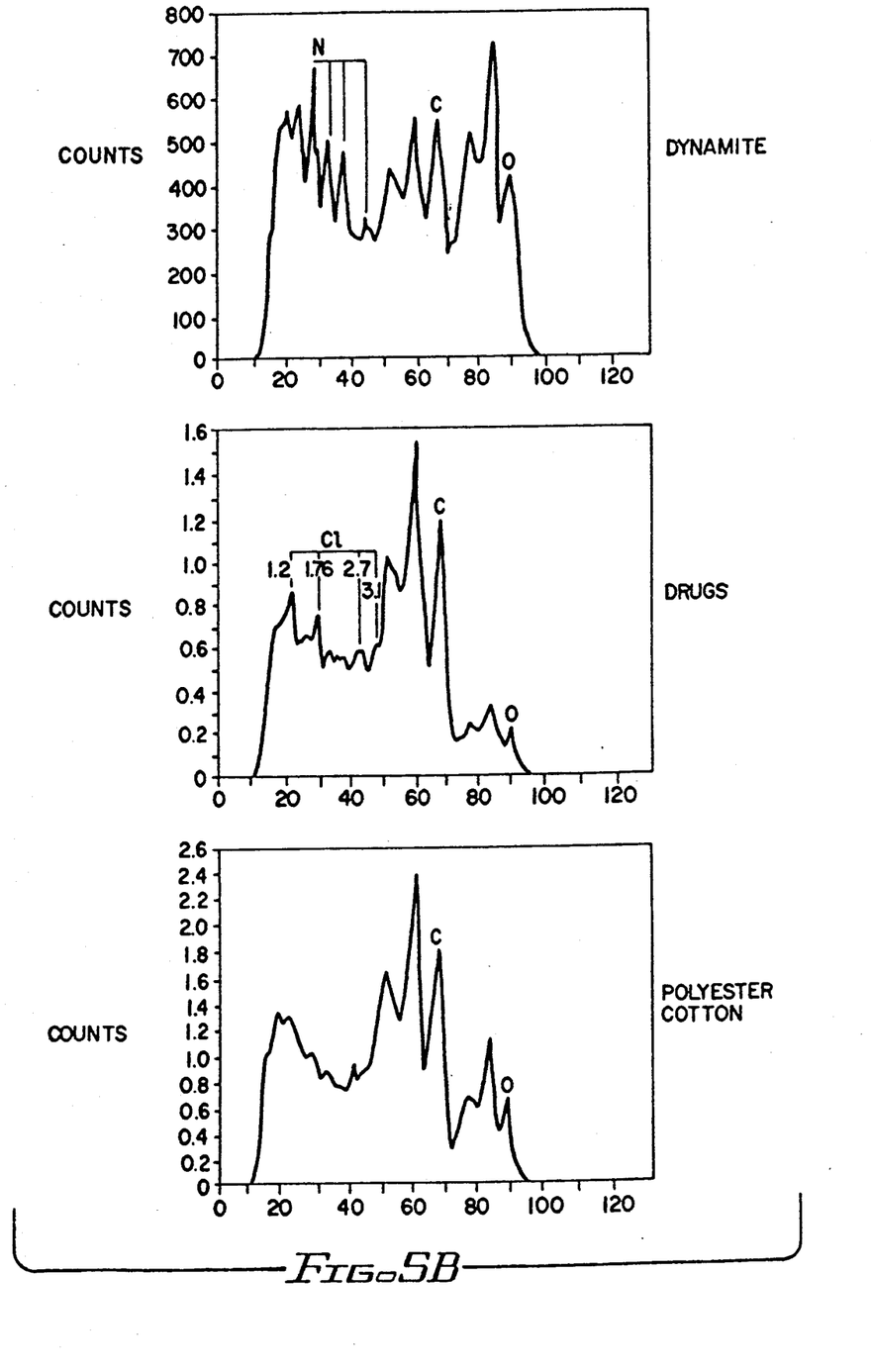
FIG. 5B shows the gamma ray spectra measured for samples of dynamite, narcotics, and polyester cotton (cloth).

To demonstrate the diagnostic power of the present invention, in FIG. 5B are shown the gamma ray spectra that were measured with simulants of dynamite, drugs (narcotics), and polyester cotton (cloth) using a pulsed beam of D(d,n) neutrons.

As will be appreciated by those skilled in the art, there are several parameters that influence the accuracy and efficiency of the above-described detection system. Primary among these parameters are those associated with the kinematics of the neutron producing nuclear reactions. Preferably, the neutrons produced by either the HI+p or the D+d reactions should have a well defined and sharp energy, $E_n$. Thus, the distance they travel into the interrogated object will be known from the multiplication of the time the neutron travels from the neutron producing target 58 to the point of interaction in the object with the neutron velocity, and can be expressed, with sufficient accuracy, as:

$$d(\text{cm}) = vt = \sqrt{(2E_n/M_n)} \, t = 1.38 \sqrt{E_n(\text{MeV})} \, t(\text{nsec})$$

where $M_n$ is the neutron mass. As seen from the above expression, the intrinsic uncertainty in the spatial (longitudinal) position of the source neutrons may arise from uncertainty in both the neutron energy and the production time of the neutrons. Further uncertainties may arise if there is instrumental uncertainty in determining the various times associated with the time of flight measurement, mainly due to the timing circuitry.

The energy spread in the kinematically focused neutrons produced in the H(HI,n) reaction depends on how far over the threshold is the incoming beam, and this spread leads to an uncertainty in the position of the product neutron packet. A $^{14}$N beam 0.5 MeV over threshold, for example, has an energy spread on the order of 0.83 MeV with a mean energy of 5.60 MeV.

The other major contribution to the longitudinal uncertainty is the position of the neutron due to the length of the ion beam packet striking the neutron production target 58. This ion beam packet length is a characteristic of the cyclotron (or other accelerator/pulsing device). Most known cyclotrons have relatively short narrow beam pulses. For example, $^{14}$N beams around 90 MeV are available with −5 nsec pulse widths. For a $^{14}$N beam, 0.5 MeV over threshold, this leads to a spatial uncertainty of the produced neutrons of around 16 cm, which is relatively large. Other spatial uncertainties are shown in Table 1. Table 1 thus emphasizes the desirability of using a short beam pulse for this application. It is noted that the two uncertainties in the interaction position referenced above add in quadrature along with any uncertainties arising from the instrumentation.

TABLE 1

| Spatial Uncertainty of Various Energy Neutrons Due to Time Spread of the Production Beams | | |
|---|---|---|
| E (MeV) | Δt (ns) | Δd (cm) |
| 4 | 5 | 14 |
| 5 | 5 | 15 |
| 6 | 5 | 17 |
| 4 | 2 | 6 |
| 5 | 2 | 6 |
| 6 | 2 | 7 |

Once a time-energy spectrum 72, or equivalent, has been obtained for each interrogation spot of the scanning beam, a final processing step is utilized to make a decision as to whether the detected data represents contraband or not. The gamma ray data (energy) and neutron data (time of flight) plus other system information are processed together to arrive at this decision. Such other system information may include, e.g., weight of the object, a neutron and/or X-ray image of the object and the like. The decision is made in a way that minimizes the probability of false alarm for a given probability of detection.

In general, the decision analysis methods and techniques developed for TNA (thermal neutron activation) detection systems, see, e.g., U.S. Patent Application Ser. No. 07/367,534, filed 06/16/89, are applicable to the present invention. The input data obtained from the two systems are similar in kind, comprising gamma ray spectroscopic and spatial distribution information. The techniques of discriminant analysis and image analysis used in the TNA systems are therefore appropriate for the collimated fast, pulsed neutron system of the present invention. The main difference between these prior systems and the present system relative to processing the data is the direct multielemental mapping in the present invention while avoiding the complex image reconstruction. This is a significant advantage, as it allows the decision analysis to move forward at a rapid rate, thereby allowing a suitable feedthrough rate to be maintained for the objects being examined.

Another significant advantage of the present invention over prior nuclear-based detection systems, such as those disclosed in the aforecited patent applications, is that the pulsed collimated neutron burst used by the present invention significantly reduces the amount of shielding required. This is because the employed pulsed collimated neutron burst is very directional in nature. Hence, shielding need only be positioned around those areas of the interrogation chamber 18 (FIG. 1) that will receive a neutron burst. Only minimal shielding, if any, need be placed around the areas of the chamber 18. This allows the overall detection system size to be smaller than prior art systems.

A further advantage of the present invention is its ability to readily detect the specific light nuclei, e.g., oxygen, nitrogen, and carbon, commonly existing in contraband, while easily discriminating other nuclei not found in contraband. This advantageous result is achieved because the particular energy selected ($\sim$8MeV) for the incoming neutron burst generates preferentially gamma rays from the light nuclei of interest. In contrast, prior art systems using fast neutrons of higher energies ($\sim$14MeV) typically generate a host of gamma rays from nuclei not of interest. Thus, the prior art systems must sort the detected gamma rays to ascertain those of interest from those not of interest to a greater degree than is required with the detection system of the present invention.

Moreover, because of the ability of the present invention to readily detect just the light nuclei of interest in contraband, the present invention further lends itself to the rapid detection of concealed drugs and the analysis of agricultural products in bulk.

Table 2, below, identifies the elemental composition of, e.g., common drugs and narcotics, including the ratio of carbon to oxygen found in such substances. Data such as that shown in Table 2 thus aids in making the determination as to whether such substances are present in an interrogated object.

TABLE 2

Elemental Composition of Narcotics and Common Materials

| MATERIAL | WEIGHT | | | | | |
|---|---|---|---|---|---|---|
| Narcotics: | C | H | O | N | OTHER | C/O |
| Heroin | 68.2 | 6.28 | 21.66 | 3.79 | | 3.1 |
| Heroin Hydrochloride | 62.14 | 5.69 | 19.71 | 3.45 | Cl 8.74 | 3.15 |
| Cocaine | 67.3 | 6.92 | 21.1 | 4.61 | | 3.2 |
| Cocaine Hydrochloride | 60.03 | 6.53 | 18.83 | 4.12 | Cl 10.43 | 3.19 |
| Morphine | 71.56 | 6.71 | 16.82 | 4.91 | | 4.2 |
| PCP | 85.87 | 10.35 | 0 | 5.76 | | $\infty$ |
| LSD | 74.27 | 7.79 | 4.95 | 12.99 | | 15 |
| Alcohol | 52.2 | 13.0 | 34.8 | 0 | | 1.5 |
| Sugar (Sucrose) | 42.1 | 6.43 | 51.5 | 0 | | 0.82 |
| Oil | 77 | 12 | 11 | 0 | | 7 |
| Barley | 43.2 | 6.85 | 4.90 | 1.0 | | .88 |
| Soybeans | 49.0 | 7.45 | 35.1 | 8.44 | | 1.40 |
| Pine Hartwood | 54.38 | 6.31 | 39.16 | | | 1.39 |

Table 3 below presents representative data of the constituent elements found in various types of contraband, as well as non-contraband. Data such as that shown in Table 3 further aids in making the determination as to whether a particular object being interrogated contains contraband or not.

Advantageously, a contraband detection system as above described does not require a radioactive materials license because no "byproduct material" is in the system, and further because the levels of activation products are very low. However, because the system is a "radiation producing machine", it must be registered as such with appropriate governmental radiation safety authorities. Shielding design techniques similar to those commonly used in other radiation producing machines may be used to maintain radiation levels within prescribed limits. For example, composite shielding may be used to thermalize and absorb neutrons, and lead may be used as needed to absorb gamma rays. However, as previously indicated, the amount of shielding required when only short directed neutron bursts are used is significantly reduced from that required when continuous neutron irradiation is used, and in which the emission of the neutrons is isotropic.

It should be again emphasized that while most of the schematic representations of the invention presented herein show a single source of the fast pulsed neutron beam, i.e., a single pulsed beam, alternative embodiments of the invention contemplate the use of multiple pulsed beams, each scanning the object from a different vantage point. In such an embodiment, appropriate timing measurements are used to keep track of which gamma ray originated from which beam (and hence, the location of the origin of each detected gamma ray within the multiple-beam scanned object). The use of multiple beams in this fashion advantageously allows the object to be more thoroughly and efficiently examined.

While the invention herein disclosed has been described by means of specific embodiments and applications thereof, numerous modifications and variations could be made thereto by those skilled in the art without departing from the scope of the invention set forth in the claims.

TABLE 3

Various Physical Properties and Approximate Composition of Explosives and Other Materials

| MATERIAL | PHYSICAL STATE | DENSITY (g/cm³) | H | C | N | O | OTHER | O + N |
|---|---|---|---|---|---|---|---|---|
| Nitroglycerine (NG) | Liquid | 1.6 | 2.2 | 15.9 | 18.5 | 63.4 | 0 | 81.9 |
| EGDN | Liquid | 1.48 | 2.4 | 22.0 | 17.1 | 58.5 | 0 | 75.6 |
| Amn. Nitrate | Solid | 1.7 | 5.0 | 0 | 35.0 | 58.0 | 0 | 93 |
| Black Powder | Solid | 1.7–1.95 | 0 | ~22 | 10 | 36 | S (3), K (29) | ~46 |
| Nitrocellulose (9–14% N) | Solid | 1.50–1.7 | 2.4 | 24.3 | 14.1 | 59.2 | 0 | 73.3 |
| PEIN (Pure) | Solid | 1.76 | 2.4 | 19.0 | 17.7 | 60.7 | 0 | 78.4 |
| PEIN (Data Sheet) | Solid | 1.48 | 4.3 | 31.4 | 12.2 | 52.1 | 0 | 64.3 |
| TNT (Pressed) | Solid | 1.63 | 2.2 | 37.0 | 18.5 | 42.3 | 0 | 60.5 |
| Composition B | Solid | 1.71 | 2.7 | 24.4 | 30.5 | 42.7 | 0 | 73.2 |
| Lead Styphnate | Solid | 3.02 | 0.7 | 15.4 | 9.0 | 30.8 | Pb: 44.2 | 39.8 |
| Tetryl | Solid | 1.57–1.71 | 1.8 | 29.3 | 24.4 | 44.6 | 0 | 69 |
| Dynamite | Solid | 1.25 | 4.0 | 14.0 | 15.–20 | 59.0 | Na: 10.0 | 74–79 |
| Octogen (HMX) | Solid | 1.90 | 2.8 | 16.2 | 37.8 | 43.2 | 0 | 81 |
| Composition 3 (C-3) | Putty-like Solid | 1.58–1.62 | 2.9 | 22.8 | 32.8 | 41.6 | 0 | 74.4 |
| Composition 4 (C-4) | Putty-like Solid | 1.64–1.66 | 3.6 | 21.9 | 34.5 | 40.2 | 0 | 74.7 |
| Picric Acid | Solid | 1.76 | 1.3 | 31.4 | 18.3 | 48.9 | 0 | 67.3 |
| Lead Azide (Detonator) | Solid | 4.48 | 0 | 0 | 28.9 | 0 | Pb | 28.4 |
| Triacetone Triperoxide | Solid | 1 (?) | 9.7 | 38.7 | 0 | 51.6 | 0 | 59.7 |
| Hexametylene Triperoxide Diamine | Solid | 1.57 | 5.77 | 34.6 | 13.5 | 46.2 | 0 | 59.7 |
| NON EXPLOSIVE | | | | | | | | |
| Packed Clothes | Solid | <0.1 | | | | | | |
| Polyester | Solid | (1.38) | 3.7 | 66.7 | 0 | 29.6 | 0 | 29.6 |
| Dacron | Solid | (1.38) | 4.2 | 62.5 | 0 | 33.3 | 0 | 33.3 |
| Cotton | Solid | (1.30) | 6.0 | 48.0 | 0 | 46.0 | 0 | 46.0 |
| Wool | Solid | (1.32) | 4.7 | 37.5 | 21.9 | 5.1 | 0 | 27.0 |
| Silk | Solid | (1.25) | 5.3 | 39.5 | 28.8 | 26.3 | 0 | 55.1 |
| Nylon | Solid | (1.14) | 9.7 | 63.7 | 12.4 | 14.2 | 0 | 26.6 |
| Orlon, Acrylan | Solid | (1.16) | 5.7 | 67.9 | 26.4 | 0 | 0 | 26.4 |
| Other Materials | | | | | | | | |
| ABS (Acetonitrile Butadiene Styrene) | Solid | 1.20 | 8.92 | 84.5 | 76.5 | 0 | 0 | 76.5 |
| Melamine-Formaldehyde | Solid | 1.48 | 5.5 | 43.6 | 50.9 | 0 | 0 | 50.9 |
| Neoprene (Wet Suites) | Solid | 1.25 | 4.4 | 64.0 | 0 | 0 | Cl: 31.6 | 0 |
| Polyurethane | Solid | 1.50 | 7.9 | 52.2 | 12.2 | 27.8 | 0 | 40 |
| Polyethylene | Solid | 0.92–0.96 | 14.3 | 85.7 | 0 | 0 | 0 | 0 |
| Polypropylene | Solid | 0.89–0.91 | 14.3 | 85.7 | 0 | 0 | 0 | 0 |
| Lucite, Acrylic Plexiglass | Solid | 1.16 | 9.1 | 54.6 | 0 | 36.4 | 0 | 36.4 |
| PVC | Solid | 1.2–1.55 | 4.8 | 38.4 | 0 | 0 | Cl: 56.8 | 0 |
| Saran | Solid | 1–1.7 | 3.1 | 30.0 | 0 | 0 | Cl: 66.9 | 0 |
| Water | Liquid | 1 | 11.1 | 0 | 0 | 89.9 | 0 | 89.9 |
| Ethyl Alcohol | Liquid | 0.79 | 13.1 | 52.1 | 0 | 34.0 | 0 | 34.0 |
| Sugar | Solid | 1.59 | 6.5 | 42.0 | 0 | 51.4 | 0 | 51.4 |

What is claimed is:

1. Contraband detection apparatus comprising:
   means for irradiating an object under investigation with a collimated pulsed beam of fast neutrons having a pulse width of less than 5 nanoseconds;
   first detecting means for detecting gamma rays emitted from said object as a result of interactions between a neutron from said pulsed beam of fast neutrons and an atomic nucleus within said object;
   identifying means for identifying a particular atomic element which gives rise to a particular detected gamma ray;
   locating means for determining the approximate location within said object of the origin of each gamma ray detected by said detecting means without the necessity of detecting associated particles; and
   second detection means responsive to said irradiating means, identifying means and locating means for detecting a distribution and concentration of at least one atomic element within said object indicative of the presence of contraband.

2. The contraband detection apparatus as set forth in claim 1 wherein said identifying means comprises:
   measuring means for measuring the energy of each detected gamma ray, and
   means responsive to said measured energy for identifying the particular atomic element from which the detected gamma ray originated.

3. The contraband detection apparatus as set forth in claim 2 wherein said irradiating means comprises:
   means for generating a highly collimated pulsed beam of fast neutrons, and
   means for moving said object relative to said beam so that said fast neutrons enter a prescribed volume of said object.

4. The contraband detection apparatus as set forth in claim 3 wherein said irradiating means further includes means for creating relative motion between said object and said pulsed beam so that a plurality of prescribed volumes within said object are irradiated in turn with said pulsed beam, whereby a desired portion of said object comprising said plurality of prescribed volumes has said pulsed beam pass therethrough.

5. The contraband detection apparatus as set forth in claim 3 wherein said locating means includes means for measuring the time of flight of a particular neutron within said pulsed beam up to the approximate time at which said particular neutron interacts with an atomic nucleus within said object, said time of flight measurement providing a measure of the depth at which said particular gamma ray was produced within said object.

6. The contraband detection apparatus as set forth in claim 5 wherein said time of flight measurement means includes means for measuring the time between the generation of a pulsed neutron within said beam and the detection of a gamma ray resulting from the interaction of said pulsed neutron with an atomic nucleus, said measured time including both the time of flight of said pulsed neutron from its source to its interaction with the atomic nucleus, and the time of flight of said gamma ray from said nucleus to the time of its detection by said detecting means, the time of flight of said neutron being much greater than the time of flight of said gamma ray.

7. The contraband detection apparatus as set forth in claim 6 further including correction means for correcting said time of flight measurement to minimize the effects of the time of flight of said gamma ray, whereby said time of flight measurement includes primarily the time it takes said pulsed neutron to travel from its source to the atomic nucleus with which it interacts.

8. The contraband detection apparatus as set forth in claim 6 wherein said time of flight measurement means includes means for measuring the time between the detection of a gamma ray and the generation of a pulsed neutron.

9. The contraband detection apparatus as set forth in claim 5 wherein said second detection means includes means for electronically creating a density image of particular elements within said object indicative of contraband, said density image being created directly from the identity of said atomic elements identified by said identifying means and the location of said atomic elements determined by said locating means.

10. The contraband detection apparatus as set forth in claim 9 wherein the particular elements within said object indicative of contraband comprise oxygen, nitrogen or carbon.

11. The contraband detection apparatus as set forth in claim 10 wherein the particular elements within said object indicative of contraband further include hydrogen or chlorine.

12. The contraband detection apparatus as set forth in claim 10 wherein the contraband detected by said apparatus is selected from the group comprising explosives or narcotics.

13. A contraband detection system comprising:
   means for generating a recurring short pulse of less than five nanoseconds of directed fast neutrons;
   means for scanning an object under investigation for the presence of contraband with said recurring short pulse of directed fast neutrons, each of said fast neutrons possibly reacting with a particular atomic nucleus present within said object, thereby generating gamma rays having an energy characteristic of the particular atomic nucleus with which said fast neutrons react;
   means for detecting the gamma rays produced by neutrons in reaction with atomic nuclei, said detection means including means for detecting the energy of a particular gamma ray and the time of its detection relative to the time of generation of said short pulse of fast neutrons; and
   means for determining a particular volume element, or voxel, within said object from which a particular detected gamma ray originated without the necessity of detecting associated particles, such as alpha particles, that may be generated by the means for generating the fast neutrons, said detected gamma ray thereby providing a direct indication of the particular atomic nucleus in said particular voxel; the particular atomic nuclei, present in a sample of the voxels within said object providing a direct indication of the abundances and distributions of particular elements within said object; a prescribed abundance and distribution of particular elements within said object providing a direct indication of the presence of contraband within said object.

14. The contraband detection system as set forth in claim 13 wherein said gamma ray detecting means comprises an array of detectors positioned proximal said object.

15. The contraband detection system as set forth in claim 13 wherein said voxel determining means comprises means for measuring the approximate time of flight of a particular pulse of high energy neutrons within said short pulse of directed high energy neutrons from the time said particular pulse is generated until a neutron within said pulse interacts with an atomic nucleus, the location of said voxel thus being determinable from the known kinematics associated with said short pulse of directed high energy neutrons and said measured time of flight.

16. The contraband detection system as set forth in claim 15 wherein said means for measuring the time of flight includes electronic means for measuring the time between the generation of a particular pulse of high energy neutrons and the detection of a gamma ray by said gamma ray detecting means.

17. The contraband detection system as set forth in claim 16 wherein said recurring short pulse of high energy neutrons is generated every T seconds, and wherein said electronic measuring means measures the time between the detection of a gamma ray by said gamma ray detecting means, and the subsequent generation of the next pulse of high energy neutrons.

18. The contraband detection system as set forth in claim 13 wherein said means for scanning comprises means for controllably directing a specified number of short pulses of said high energy neutrons at respective volumes of said object fronting said high energy neutron generating means, said short pulses of high energy neutrons penetrating into said object through said respective volumes.

19. The contraband detection system as set forth in claim 18 wherein said scanning means includes means for creating controlled relative motion between said object and said directed high energy short pulse neutron generating means, whereby said respective volumes of said object have a short neutron pulse pass therethrough in a controlled fashion.

20. A system for detecting contraband comprising:

(a) means for scanning an object under investigation with a pulsed beam of highly collimated fast neutrons by controllably directing said pulsed beam at a prescribed volume of said object, said pulsed beam of highly collimated fast neutrons having a pulse width of less than 5 nanoseconds;

(b) means for detecting gamma rays having prescribed energies emitted from said prescribed volume of said object as a result of interactions between pulsed fast neutrons from said pulsed beam of fast neutrons and atomic nuclei of particular elements within said object, said prescribed energies corresponding to atomic elements commonly found in contraband; and (c) means responsive to said detecting means for ascertaining whether a distribution and concentration of at least one atomic element indicative of contraband exists within said prescribed volume, said means performing its contraband detecting function without the necessity of detecting associated particles, such as alpha particles, that may be generated coincident with the pulsed fast neutrons.

21. The system for detecting contraband as set forth in claim 20 wherein said scanning means includes means for determining the approximate time of flight of a burst of pulsed fast neutrons within said pulsed beam of fast neutrons up until the time of interaction with atomic nuclei within said object, said interaction causing said gamma rays to be produced, said time of flight providing a measure of the depth within said object at which the gamma rays originated, and hence a measure of the depth within the object along a path of said pulsed beam of fast neutrons at which a particular atomic element, commonly found in contraband, is located, said time of flight thereby defining a particular volume element, or voxel, of the object within which said particular atomic element is found.

22. The system for detecting contraband as set forth in claim 21 wherein said means for ascertaining the distribution and concentration of said at least one atomic element indicative of contraband includes means for combining the time-of-flight information determined by said scanning means with the detected gamma ray information from said gamma ray detecting means to produce a two-dimensional energy-time spectrum, from which two-dimensional energy-time spectrum the approximate location of specified atomic elements within said object can be fairly deduced.

23. A method of detecting contraband comprising the steps of:

(a) directing a pulsed beam of fast neutrons, laterally limited, towards an object under investigation said pulsed beam having a pulse width of less than 5 nanoseconds; and (b) detecting gamma rays having prescribed energies emitted from a prescribed volume of said object as a result of interactions between pulsed fast neutrons from said pulsed beam of fast neutrons and atomic nuclei of a particular elements within said prescribed volume, said prescribed energies corresponding to atomic elements commonly found in contraband.

24. The method of detecting contraband as set forth in claim 23 further including repeating steps (a) and (b) for a sufficiently large number of prescribed volumes of the object under investigation so as to ascertain whether a distribution and concentration of at least one atomic element indicative of contraband exists within said object.

25. The method of detecting contraband as set forth in claim 24 wherein step (b) includes measuring the energy of the detected gamma rays and the time at which the gamma rays are detected relative to the time at which the pulsed fast neutrons are generated, and obtaining a two-dimensional energy-time spectrum from said energy and time measurements for the prescribed volume of said object receiving said pulsed beam of fast neutrons.

26. The method of detecting contraband as set forth in claim 25 wherein said step of measuring the time at which gamma rays are detected comprises determining the approximate time of flight of a burst of pulsed neutrons in said laterally limited pulsed beam of fast neutrons up until the time said burst interacts with atomic nuclei and causes a gamma ray to be produced, and correlating said time of flight to an approximate depth within said object where the atomic nuclei are located along the path of said pulsed neutron beam, said correlation allowing said two-dimensional energy-time spectrum to be effectively converted into a two-dimensional energy-location spectrum.

* * * * *

UNITED STATES PATENT AND TRADEMARK OFFICE
CERTIFICATE OF CORRECTION

PATENT NO. : 5,076,993
DATED      : December 31, 1991
INVENTOR(S): Sawa, et al.

It is certified that error appears in the above-identified patent and that said Letters Patent is hereby corrected as shown below:

Title page [56]: Under the "Jordan" reference, change the issue date from "4/1964" to --8/1964--. IN THE SPECIFICATION: Column 7, line 8, delete the comma after "focused". Column 7, line 30, after "(cloth)" replace the period with --; and--. Column 9, line 41, change "$\Psi L, MAX = V_{n,cm/cm}$" to --$\Psi L_{MAX} = V_{n,cm}/V_{cm}$--. Column 10, line 11, delete the period after the parenthesis. Column 10, line 23, change "17a,)," to --17a),--. Column 10, line 36, delete the period after the parenthesis. Column 10, line 41, change "my" to --by--. Column 11, line 4, change "if" to --it--. Column 11, line 50, delete the comma after "arrival". Column 12, line 30, after "known" add --techniques--. Column 13, lines 34-35, change "patent Application" to Patent Application--. Column 14, line 35, change "-5" to ---5--. Columns 17-18, line 11, for "Nitrocellulose", change "1.50-1,7" to --1.50-1.7--. Columns 17-18, line 19, for "Dynamite" change "15.-20" to --15-20--. Columns 17-18, line 30, change "Hexametylene" to --Hexamethylene--.
IN THE CLAIMS: Claim 20, column 21, line 19, change "detecting" to --detection--. Claim 23, column 22, line 13, after "nuclei of" delete "a".

Signed and Sealed this

Seventh Day of September, 1993

Attest:

BRUCE LEHMAN

Attesting Officer

Commissioner of Patents and Trademarks